United States Patent [19]
Mays et al.

[11] Patent Number: 5,361,061
[45] Date of Patent: Nov. 1, 1994

[54] COMPUTER CARD DATA RECEIVER HAVING A FOLDABLE ANTENNA

[75] Inventors: Kevin R. Mays; Tony Y. Maroun; Vernon L. Diehl, all of Boynton Beach, Fla.

[73] Assignee: Motorola, Inc., Schaumburg, Ill.

[21] Appl. No.: 963,343

[22] Filed: Oct. 19, 1992

[51] Int. Cl.$^5$ ............................................. H01Q 1/24
[52] U.S. Cl. ............................ 340/825.44; 455/269; 455/348; 343/702; 343/871; 343/872
[58] Field of Search .................. 340/825.44, 311.1; 455/347, 348, 269, 271, 346; 343/702, 720, 845, 846, 871, 872, 880, 881; 429/163, 96, 98, 100; 361/683, 686, 814

[56] References Cited

U.S. PATENT DOCUMENTS

| Re. 32,365 | 3/1987 | Sebestyen | 340/311.1 |
| 4,313,119 | 1/1982 | Garay et al. | 343/702 |
| 5,043,721 | 8/1991 | May | 340/825.44 |

FOREIGN PATENT DOCUMENTS

| 3-179801 | 8/1991 | Japan | 343/702 |

OTHER PUBLICATIONS

PC Card Standard Release 2.0, Personal Computer Memory Card International Association, Sep. 1991.

*Primary Examiner*—Michael Horabik
*Attorney, Agent, or Firm*—Philip P. Macnak; Thomas G. Berry

[57] ABSTRACT

A computer card data receiver (10) includes a housing (14) having a top planar surface (16) and a bottom planar surface (18) and a thin profile suited to fit within a recessed data interface port (32) of an external computer (30). An antenna (12) is coupled to the top planar surface (16) of the housing (14) for intercepting transmitted selective call address signals and data associated therewith. The antenna (12) is rotatable between a first antenna position (12A) and a second antenna position (12B), the first antenna position (12A) being selected when the housing (14) is removed from the recessed data interface port (32), and the second antenna position (12B) being selected when the housing (14) is inserted into the recessed data interface port (32). A receiver (40) is enclosed within the housing (14) and receives and detects the intercepted selective call address signals and data associated therewith.

20 Claims, 3 Drawing Sheets

COMPUTER CARD DATA RECEIVER HAVING A FOLDABLE ANTENNA

BACKGROUND OF THE INVENTION

1. FIELD OF THE INVENTION

The present invention relates generally to the field of portable communication receivers, and more particularly to a computer card data receiver having a foldable antenna.

2. DESCRIPTION OF THE PRIOR ART

Communications receivers having data ports for coupling with external computers are well-known in the art. An example is the NewsStream™ Advanced Information Receiver manufactured by Motorola, Inc. of Schaumburg, Ill. Some laptop computers are now being built with a standard interface, e.g., the Personal Computer Memory Card International Association (PCMCIA) interface. Today's microminiature communications receivers designed for use with the PCMCIA interface are so small that much of the communication receiver disappears behind housing walls surrounding the PCMCIA interface when the receiver is coupled with the external computer.

Because most of the components of the communication receiver are enclosed within the recessed data interface port of the external computer, significant interference between the communication receiver and the external computer can occur. To overcome this problem, the recessed data interface port is generally shielded to minimize the interaction between the communication receiver and the external computer. However, when the recessed data interface port is shielded, receiver sensitivity is significantly reduced, greatly reducing the service area in which the communication receiver can operate.

What is therefore needed is a means to retain the sensitivity of the communication receiver, while maintaining the portability of the communication receiver when the receiver is removed from the external computer.

SUMMARY OF THE INVENTION

In accordance with one aspect of the present invention, a computer card data receiver comprises a housing having a top planar surface and a bottom planar surface and a thin profile suited to fit within a recessed data interface port of an external computer. An antenna is coupled to the top surface of the housing for intercepting transmitted selective call address signals and data associated therewith. The antenna is selectably rotatable between a first antenna position and a second antenna position, the first antenna position is selected when the housing is removed from the recessed data interface port, and the second antenna position is selected when the housing is inserted into the recessed data interface port. A receiver is enclosed within the housing and coupled to the antenna for receiving and detecting the intercepted selective call address signals and data associated therewith.

In accordance with another aspect of the present invention, a computer card data receiver comprises a housing having a first housing portion having a top planar surface and a bottom planar surface and a thin profile suited to fit within a recessed data interface port of an external computer. The housing further includes a second housing portion remaining external to the recessed data interface port, and has a top planar surface, and a bottom planar surface contiguous with the bottom planar surface of the first housing portion. An antenna is coupled to the top surface of the second housing portion for intercepting transmitted selective call address signals and data associated therewith. The antenna is selectably rotatable between a first antenna position and a second antenna position. The first antenna position is selected when the housing is removed from the recessed data interface port, and the second antenna position is selected when the housing is inserted into the recessed data interface port. A printed circuit board is contained within the first housing portion. A receiver is supported on the printed circuit board and enclosed within the first housing portion and is coupled to the antenna for receiving and detecting the intercepted selective call address signals and data associated therewith. A battery is contained within the second housing portion for supplying power to the receiver.

DESCRIPTION OF THE PREFERRED EMBODIMENTS

Figure 1:
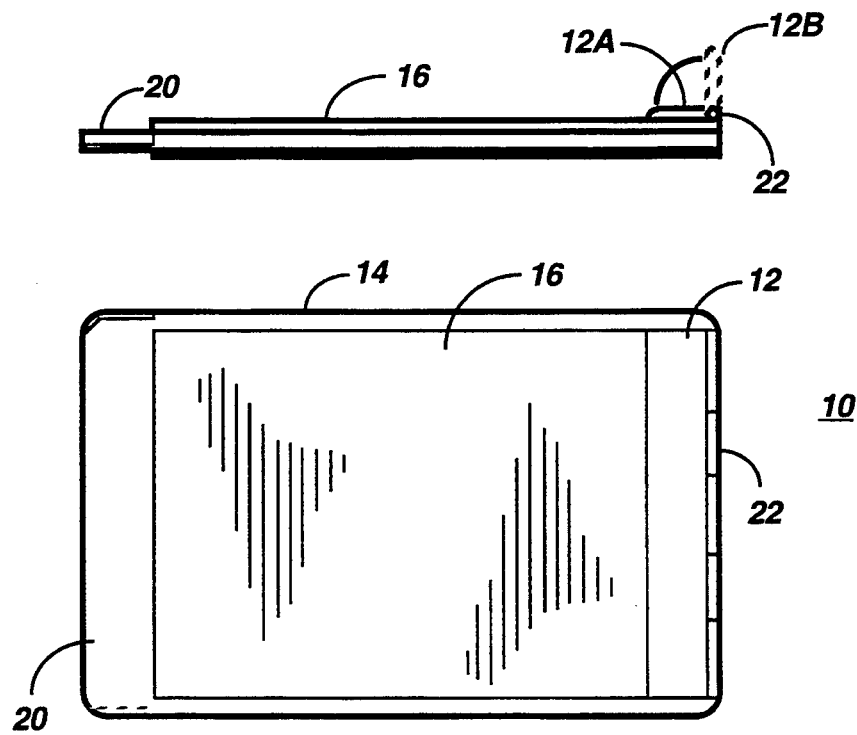
FIG. 1 shows a side and top orthogonal view of a computer card data receiver having a foldable antenna in accordance with a first embodiment of the present invention.
Figure 3:
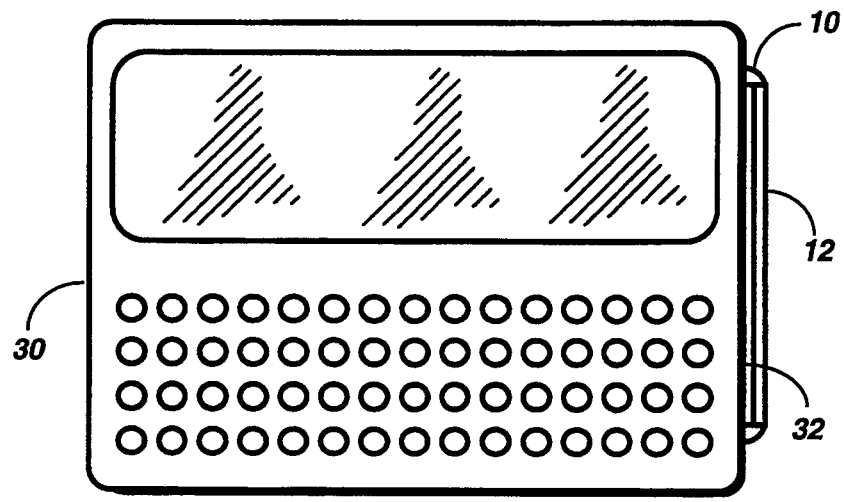
FIG. 3 is a top orthographic view of the computer card data receiver coupled to an external computer in accordance with the first embodiment of the present invention.

FIG. 1 shows a side and top orthogonal view of a computer card data receiver 10 having a foldable antenna 12 in accordance with a first embodiment of the present invention. The computer card data receiver 10 includes a housing 14 which is preferably manufactured using a plastic material, such as a polycarbonate plastic, and is formed using such manufacturing techniques as injection molding. The housing 14 has a top planar surface 16 and a bottom planar surface 18 manufactured preferably from a conductive material such as sheet metal, and more particularly such as stainless steel. The housing 14 has a thin profile which is dimensionally similar to the thickness of a Type II PC Card described in the PC Card Standard released by the Personal Computer Memory Card International Association (PCMCIA). A receiver and signal processing circuits, as will be described below are supported on a printed circuit board (not shown) which is contained within the housing 14. A connector 20 is contained within the housing 14 and allows the computer card data receiver to be inserted into a recessed data interface port to provide communication with an external computer. The foldable antenna 12 is coupled to the top planar surface 16 of the housing 14 using a hinge 22 thereby allowing the antenna 12 to be selectably rotated between a first antenna position 12A and a second antenna position 12B. The first antenna position 12A positions the antenna 12 flat on, or parallel to, the top planar surface 16, while the second antenna position 12B rotates the antenna 12 perpendicular to the top planar surface 16. The antenna 12 is normally folded flat on the top planar surface 16 to enable the computer card data receiver 10 to be comfortably and conveniently carried by a user within the user's pocket. However, the thickness of the computer card data receiver 10 is generally too thick within the region of the antenna 12, and consequently the antenna 12 must be rotated vertically, to allow the computer card data receiver 10 to be inserted into the recessed data interface port of the external computer, as shown in FIG. 3. The antenna 12 when positioned in the second antenna position 12B, also as stated above, places the antenna outside the recessed data interface port, and such placement is also required because the recessed data interface port is shielded to minimize interference between the computer card data receiver and the external computer. Because of the shielding provided, the antenna performance would be significantly reduced if positioned within the recessed data interface port.

Figure 2:
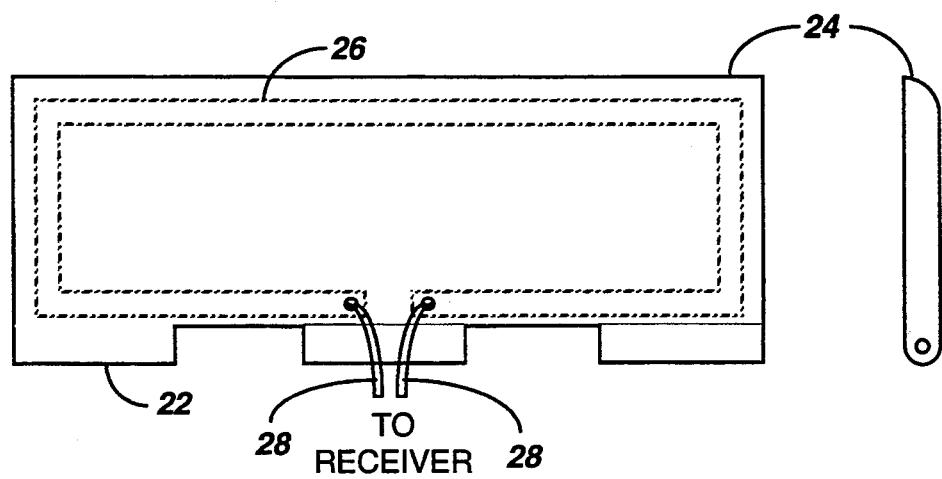
FIG. 2 is an exploded front and side view of the foldable antenna in accordance with the first embodiment of the present invention.

FIG. 2 is an exploded front and side view of the foldable antenna in accordance with the first embodiment of the present invention. The foldable antenna 12 includes an antenna housing 24 which is preferably manufactured using a plastic material, such as a polycarbonate plastic, and is formed using such manufacturing techniques as injection molding. The antenna housing 24 encloses the antenna element 26, which as shown in FIG. 2 is a single turn magnetic loop element which can be formed from sheet metal, such as copper, beryllium copper, or nickel silver which has been suitably plated to enable soldering of leads 28 to the input of the receiver located within the housing 14. The leads 28 can be formed from stranded copper wire, or a flex circuit, although it will be appreciated that other interconnect methods can be utilized as well. It will be appreciated that other materials can be utilized to form the antenna element 26, such as wire, or an etched pattern on a thin printed circuit board material, such as FR-4 glass epoxy printed circuit board material, or a flexible circuit material. While a single turn magnetic loop antenna is shown in FIG. 2, it will be appreciated that when sufficient thickness is provided within the antenna housing 24, multiple turn loops can be utilized as well for operation at lower receiver operating frequencies. In addition, it will be appreciated that the pattern which is provided can also be changed to form an electric dipole antenna, as well.

FIG. 3 is a top orthographic view of the computer card data receiver 10 coupled to an external computer 30 in accordance with the first embodiment of the present invention. The external computer 30 is preferably a portable computer, such as lap-top portables, as manufactured by IBM or Compaq, or small hand held portable computer, such as the HP95LX manufactured by Hewlett Packard Company of Palo Alto, Calif. As shown in FIG. 3, the antenna 12 is shown deployed, or rotated into the vertical position which places the antenna 12 outside of the recessed data interface port 32 of the external computer 30. While the antenna 12 is shown as being deployed in the vertical position, it will be appreciated that other antenna configurations, such as an electric field antenna, may be best deployed one hundred and eighty degrees from the closed position indicated by antenna position 12A.

Figure 4:
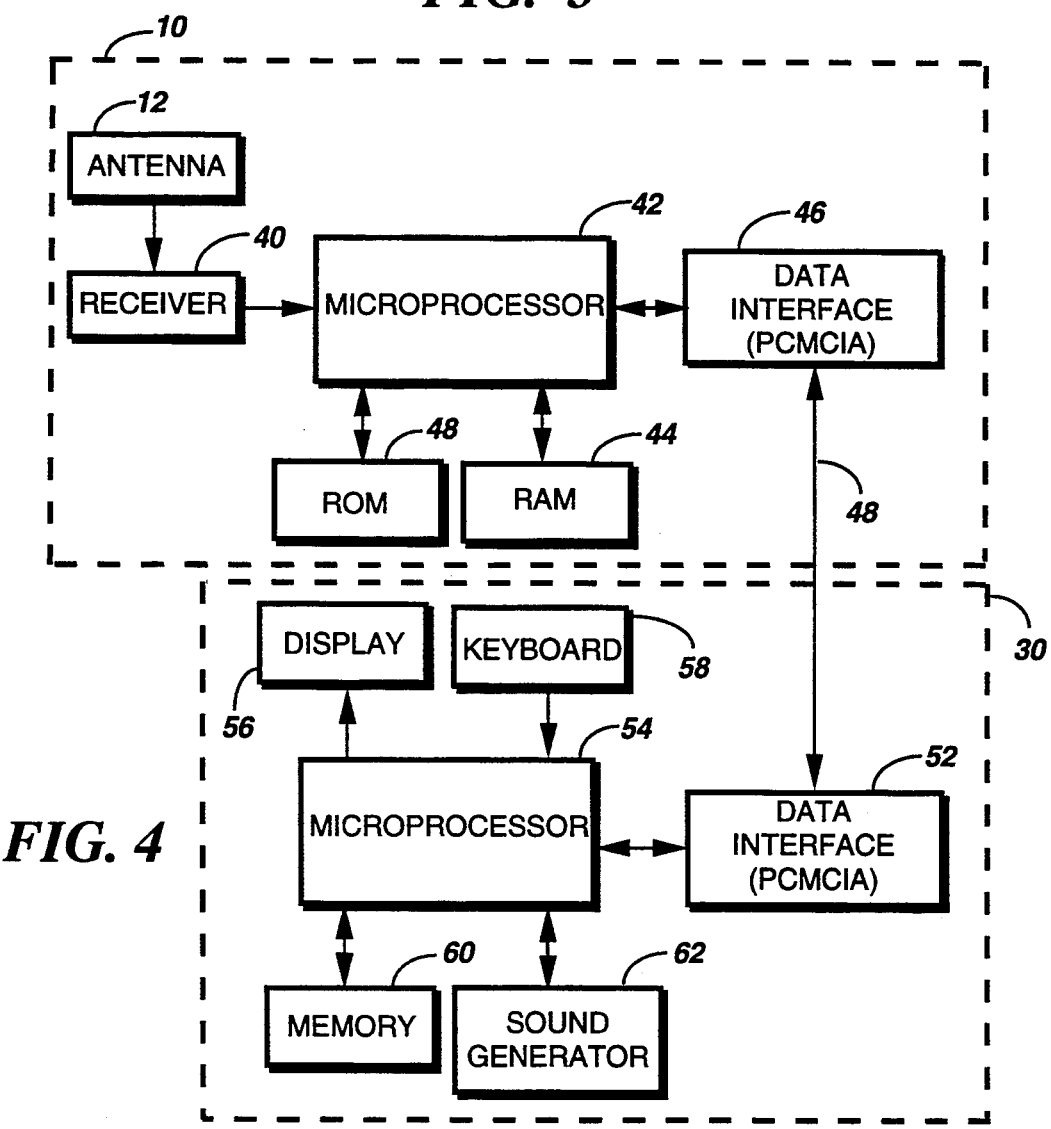
FIG. 4 is an electrical block diagram of a computer card data receiver coupled to the external computer in accordance with the first embodiment of the present invention.

FIG. 4 is an electrical block diagram of a computer card data receiver 10 coupled to the external computer 30 in accordance with the first embodiment of the present invention. The computer card data receiver 10 comprises an antenna 12 for intercepting RF signals. The antenna 12 is coupled to a receiver 40 for receiving and demodulating the RF signals intercepted. A decoder 42, which is implemented using a microprocessor, such as an MC68HC05C9 or C11 microcomputer manufactured by Motorola, Inc. of Schaumburg, Ill., processes the demodulated information to decode address information and to process and recover messages in a manner well-known to one of ordinary skill in the art. The address information and messages can be transmitted in any of a number of well-known signaling protocols, such as the Golay Sequential Code (GSC) or POCSAG signaling formats.

The microprocessor 42 is coupled to a random access memory (RAM) 44 for storing the messages recovered, and the microprocessor 42 controls the storing and recalling of the messages. An alert signal is generated by the microcomputer 42 which is coupled through the data interface 46 to the external computer 30 which generates a sensible alert as described below to alert the user when the microprocessor 42 has a message ready for presentation.

The microprocessor 42 is coupled to a read-only memory (ROM) 48 and the data interface 46, as described above, for controlling and communicating with the ROM 48 and the data interface 46, in accordance with the preferred embodiment of the present invention. One of ordinary skill in the art will recognize that a EEPROM can be substituted for the ROM 48 without deviating from the intent of the invention. The ROM 48 contains a number of firmware routines, such as a control routine comprising firmware for executing control functions, e.g., on-off, alert mode, etc., in response to control function messages received by the data interface 46. Decoding routines enable the microcomputer 42 to decode the received selective call signaling and message information, in a manner well known by one of ordinary skill in the art. An alerting routine includes firmware for causing the external computer 30 to generate an audible alert. Data transfer routines include firmware for sending information stored in the random access memory 44 from the computer card data receiver 10 to the external computer 30.

The data interface 46 is constructed and controlled in a manner that meets the well-known Personal Computer Memory Card International Association (PCMCIA) standard interface. The data interface 46 couples with the external computer 30 by a PCMCIA bus 50. One of ordinary skill in the art will recognize that other types of interfaces, e.g., an RS-232 serial interface, could be used as well.

The external computer 30 comprises a data interface 52 coupled to a microprocessor 54 for communicating with the PCMCIA bus 50. The microprocessor 54 is coupled to a display 56 and a keyboard 58 for interfacing with a user. A RAM memory 60 is coupled to and controlled by the microprocessor 54 for storing software instructions and other information received by or generated within the external computer 54. A sound generator 62 is also coupled to the microprocessor 54 for alerting the user in response to signals sent from the microprocessor 42 within the computer card data receiver 10.

Figure 5:
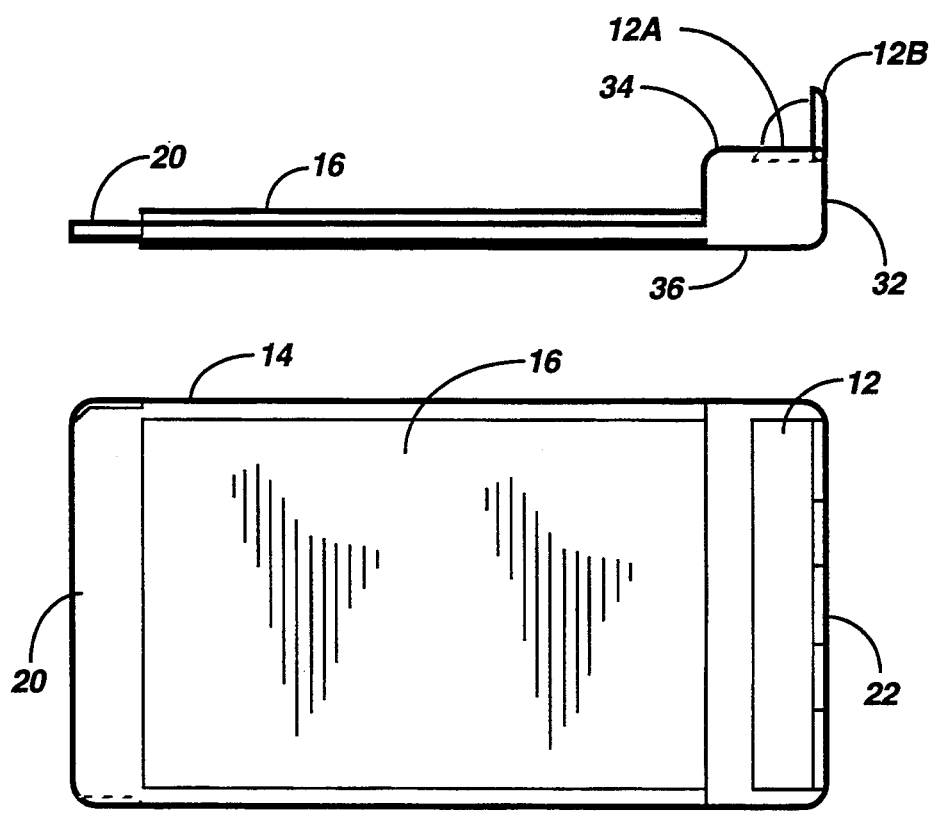
FIG. 5 shows a side and top orthogonal view of a computer card data receiver having a foldable antenna in accordance with a second embodiment of the present invention.

FIG. 5 shows a side and top orthogonal view of a computer card data receiver 10 having a foldable antenna 12 in accordance with a second embodiment of the present invention. Unlike the computer card data receiver 10 shown in FIG. 1, the computer card data receiver shown in FIG. 5 includes a housing having a first housing portion 14 which encloses a printed circuit board (not shown) which supports the majority of the components of the computer card data receiver, and a second housing portion 32 which contains a battery (not shown). The second housing portion 32 includes a top planar surface 34 on which is mounted the antenna 12, much in the same manner as previously described above. The second housing portion 32 also includes a bottom planar surface 36 which is contiguous with the bottom planar surface 18 of the first housing portion 14. Like the computer card data receiver shown in FIG. 1, the computer card data receiver of FIG. 5 includes an antenna 12 which can be rotated between two antenna positions, a first antenna position 12A in which the antenna 12 is flat against the top planar surface 34, and a second antenna position 12B, in which the antenna 12 is perpendicular to the top planar surface 34. Unlike the computer card data receiver shown in FIG. 1, the computer card data receiver of FIG. 5 recesses the antenna 12 into the body of the second housing portion, thereby eliminating the raised area when the antenna 12 is in the first antenna position 12A. A means for latching the antenna into the first, or closed, antenna position 12A can be provided on the antenna cover 24 (as shown in FIG. 2) by providing a raised area on the lip of the cover which forms a detent with a recess provided within the recessed area of the top planar surface 34.

In summary, what has been described above is a computer card data receiver which has a foldable antenna. The foldable antenna is rotated into a first, or closed, position, when the computer card data receiver is removed the from external computer, and is rotated to a second, or open position, when the computer card data receiver is inserted into the external computer. Depending upon the type of antenna located within the rotatable antenna area, the antenna may be rotated to be perpendicular to the top planar surface of the housing, or to be opened one hundred and eighty degrees from the closed position. The foldable antenna minimizes the size of the computer card data receiver to enable the receiver to be easily carried, such as in a pocket, and positions the antenna properly for best signal reception when the computer card data receiver is inserted into an external computer. Because the antenna remains external to the recessed data interface port, the antenna is not shielded by shielding provided within the recessed data interface port which minimizes interference between the computer card data receiver and the external computer.

We claim:

1. A computer card data receiver, comprising:
    a housing having a top planar surface and a bottom planar surface and a thin profile suited to fit within a recessed data interface port of an external computer;
    an antenna for intercepting transmitted selective call address signals and data associated therewith, said antenna being enclosed within a hinged planar housing member which is coupled to said top surface of said housing and which is selectably rotatable between a first position to provide a first operative orientation of said antenna and a second position to provide a second operative orientation of said antenna, said first position being selected when said housing is removed from said recessed data interface port, and said second position being selected when said housing is inserted into said recessed data interface port; and
    receiver means, enclosed within said housing and coupled to said antenna, for receiving and detecting the intercepted selective call address signals and data associated therewith.

2. The computer card data receiver according to claim 1, wherein said first position orients said antenna parallel to the plane of said top planar surface when said antenna is removed from said recessed data interface port.

3. The computer card data receiver according to claim 1, wherein said second position orients said antenna perpendicular to the plane of said top planar surface when said antenna is inserted into said recessed data interface port.

4. The computer card data receiver according to claim 1, further comprising:
    processing means, coupled to said receiver means, for processing the detected selective call address signals to enable receiving the data associated therewith; and
    data interface means, coupled to said recessed data interface port and responsive to said processing means, for transferring the received data to said external computer through said recessed data interface port.

5. The computer card data receiver according to claim 4, wherein said data interface means includes connector means for providing connection between said processing means and said external computer through said recessed data interface port.

6. The computer card data receiver according to claim 5, wherein said connector means provides a data port constructed and operated in accordance with the Personal Computer Memory Card International Association (PCMCIA) standard.

7. The computer card data receiver according to claim 1, wherein said antenna comprises
    a magnetic loop antenna coupled to said receiver means.

8. The computer card data receiver according to claim 1, wherein said antenna comprises
    an electric dipole antenna coupled to said receiver means.

9. The computer card data receiver according to claim 1, wherein said external computer is a portable laptop computer.

10. A computer card data receiver comprising:
    a housing, having a first housing portion having a top planar surface and a bottom planar surface and a thin profile suited to fit within a recessed data interface port of an external computer, and a second housing portion remaining external to said recessed data interface port, said second housing portion having a top planar surface, and a bottom planar surface contiguous with said bottom planar surface of said first housing portion;
    an antenna for intercepting transmitted selective call address signals and data associated therewith, said antenna being enclosed within a hinged planar housing member which is couple to said top surface of said second housing portion and which is rotatable between a first position to provide a first operative orientation of said antenna and a second position to provide a second operative orientation of said antenna, said first position being selected when said housing is removed form said recessed data interface port, and said second position being selected when said housing is inserted into said recessed data interface port;

a printed circuit board;

receiver means, supported on said printed circuit board and enclosed within said first housing portion, for receiving and detecting the intercepted selective call address signals and data associated therewith; and a battery, enclosed within said second housing portion, for supplying power to said receiver means.

11. The computer card data receiver according to claim 10, wherein said first position orients said antenna means parallel to the plane of said top planar surface of said second housing portion when said antenna is removed from said recessed data interface port.

12. The computer card data receiver according to claim 11, wherein said top planar surface of said second housing portion includes a recess for enclosing said antenna when said antenna is placed in said first position.

13. The computer card data receiver according to claim 10, wherein said second position orients said antenna perpendicular to the plane of said top planar surface of said second housing portion when said antenna is inserted into said recessed data interface port.

14. The computer card data receiver according to claim 10, further comprising:

processing means, supported on said printed circuit board, for processing the detected selective call address signals to enable receiving the data associated therewith; and data interface means, supported on said printed circuit board and coupled to said recessed data interface port and responsive to said processing means, for transferring the received data to said external computer through said recessed data interface port.

15. The computer card data receiver according to claim 14, wherein said data interface means includes connector means, supported by said printed circuit board, for providing connection between said processing means and said external computer through said recessed data interface port.

16. The computer card data receiver according to claim 15, wherein said connector means provides a data port constructed and operated in accordance with the Personal Computer Memory Card International Association (PCMCIA) standard.

17. The computer card data receiver according to claim 10, wherein said antenna comprises a magnetic loop antenna coupled to said receiver means.

18. The computer card data receiver according to claim 10, wherein said antenna comprises an electric dipole antenna coupled to said receiver means.

19. The computer card data receiver according to claim 10 further comprising means for latching said hinged planar housing member into said first position.

20. The computer card data receiver according to claim 10, wherein said external computer is a portable laptop computer.

* * * * *